April 3, 1951 R. J. BURKHOLDER 2,547,438
PLOW HITCH WITH TRACTION CONTROL LINKAGE
Filed June 21, 1948
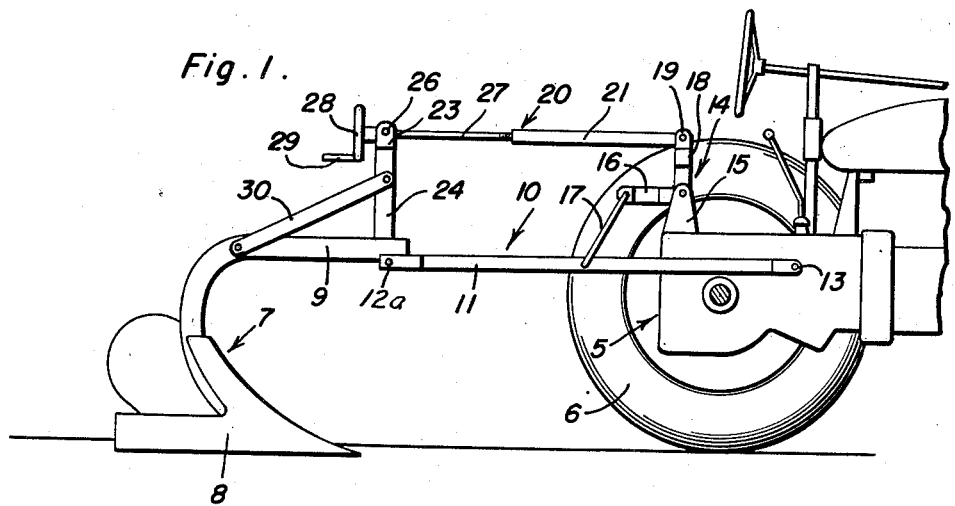
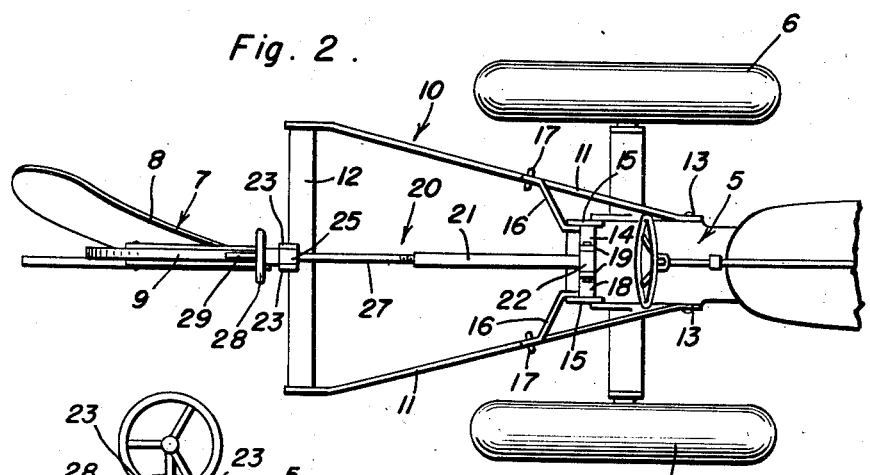
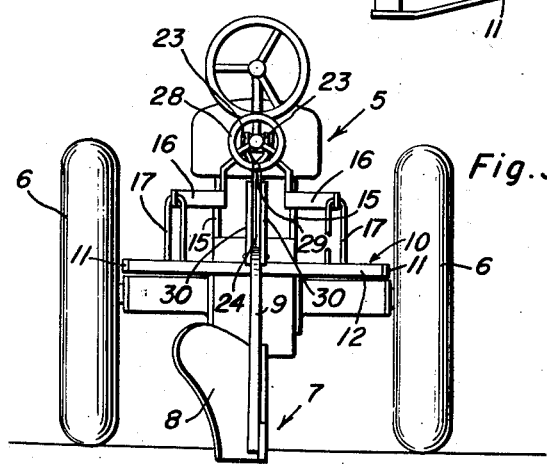
Robert J. Burkholder
INVENTOR.

Patented Apr. 3, 1951

2,547,438

UNITED STATES PATENT OFFICE 2,547,438

PLOW HITCH WITH TRACTION CONTROL LINKAGE

Robert J. Burkholder, Noel, Mo.

Application June 21, 1948, Serial No. 34,190

2 Claims. (Cl. 97—47)

The present invention relates to agricultural machines in general and has reference, in particular, to a tractor, a plow, hitch or coupling means between the two and, more in particular, special linkage between the plow and tractor which serves to transmit mechanical force which is utilized to hold the wheels of the tractor in effective traction contact with the surface traversed.

More specifically, the invention has to do with an arrangement of correctly chosen mechanical expedients which combine and coact to provide the stated linkage, the latter being such and so arranged in respect to the plow and tractor that the forward and downward movement of the plow beam, caused by the resistance of the ground to the plow share, is utilized as a source of energy, the latter force being transmitted by way of said linkage and imposed on the rear end portion of the tractor and consequently the wheels of the latter, whereby the stated wheels are pressed into effective traction contact with the earth or other surface traversed.

More specifically, in reducing to practice a preferred embodiment of the invention, I merely attach a simple draft frame to the wheel supported rear end of a tractor, hitch the beam of a conventional plow on the trailing end of the frame and install the improved linkage by connecting one end portion with the plow beam and the other end portion with the chassis of the tractor, whereby the tumble action of the plow and its beam serves to provide energy and satisfactory leverage whereby the energy is thus captured and applied as a force which is sufficient to maintain the tractor wheels in effective tractive and driving contact with the ground.

Other objects and advantages will become more readily apparent from the following description and the accompanying illustrative drawings.

In the drawings, wherein like numerals are employed to designate like parts throughout the views:

Figure 1 is a view in side elevation showing a portion of a tractor, one wheel being removed, showing a conventional plow, and the improved traction control linkage as constructed in accordance with the principles of the invention.

Figure 2 is a top plan view of the same.

Figure 3 is a rear end elevation of the structure as seen in Figures 1 and 2.

Referring now to the drawings by distinguishing reference numerals, the body or chassis of the tractor is denoted, in a general manner, by the numeral 5 and embodies ground contacting traction driving wheels 6.

The plow, which is also conventional, is denoted by the numeral 7 and includes a blade or plow share 8 which is integral with a frame which includes a beam 9, said beam being horizontal and parallel to the plow share 8.

The draft frame which serves to hitch and thus couple the plow 7 to the tractor 5 is denoted, as an entity, by the numeral 10. Said frame is of general V-shaped form and embodies a pair of forwardly converging arms or limbs 11 connected together at their rear or trailing ends by a cross piece 12. The forward ends of the arms are pivotally connected as at 13 to opposite sides of the tractor chassis.

Bellcranks 14 are pivotally mounted on upstanding ears 15 which are, in turn, rigidly supported on the tractor body or chassis in the manner shown in the drawings. The lower arms 16 of said bellcranks diverge and carry U-shaped links 17 which straddle and are hingedly connected to the intermediate portions of the arms 11. The upper arms of the bellcranks are bent toward and converge with one another, as at 18, and terminate in ears 19 which serve to accommodate an end portion of a turnbuckle 20. More specifically, the internally screw-threaded tubular member 21 of the turnbuckle has a head 22 on its forward end which is pivotally mounted between said ears 19. Similar ears 23 are formed atop the upright or post 24 which is rigidly attached to and rises at right angles from the beam 9 and these serve to accommodate a block-like adapter 25 which is pivotally mounted between said ears as at 26. The adapter is carried by the screw-threaded rod member 27 of the turnbuckle. This rod member is also turnable in the adapter block and said block is self-leveling. Then, too, a hand wheel 28 is mounted rigidly on one end of the rod and is provided with a hand crank 29 for convenience of operation. The numerals 30 designate stays which are connected at opposite ends to the beam and post, respectively. The stays are effective braces. It might be mentioned that the forward end of the plow beam is pivotally mounted on the draft frame. More specifically, the beam 9 is rigidly connected to the intermediate portion of the cross-piece 12 and the ends of the cross-piece are journaled in appropriate bearings 12a provided on the rear end portions of the arms or limbs 11. However, any suitable means other than shown may be employed to hingedly hitch the forward end of the plow beam to the trailing end of the draft frame.

It is obvious that, in use, resistance of the earth and soil to the movement of the plow, as it is pulled along, causes the plow to bob up and down and to tumble or tilt forwardly and this, in turn, tilts the plow beam forwardly and downwardly. By rigidly connecting the post means to the hingedly mounted plow beam, said post means serves to provide a lever which lever forces the turnbuckle or linkage forwardly. The turnbuckle, in turn, rocks the bellcranks on their supporting brackets or lugs 15 and imposes a downward thrust on the brackets and consequently on the chassis of the tractor and, in addition, forces the tractor wheels into firm tractive contact with the ground. Force is also applied to assist in this downward pressure of the tractor wheels through the medium of the frame arms 11. This is accomplished by the upward ride of the bellcrank arms 16 and the lift imparted thereto by the link connections 17 between said bellcranks and arms 11. The arms 11, through their connections with the tractor chassis, tend to "drive" the chassis down and the force or load thus imposed, presses the wheels into firm driving contact with the ground or other surface traversed.

The degree or amount of traction is automatically established and regulated and increases as the resistance of the plow share increases since the counter-thrust forward from the post through the turnbuckle and associated linkage means causes the lower bellcrank arms, through the links 17, to lift or pull up on the arms 11 thereby causing downward pressure on the elbow portions of the bellcranks and consequently the brackets 15 to which they are attached.

It is thought that persons skilled in the art to which the invention relates will be able to obtain a clear understanding of the invention after considering the description in connection with the drawings. Therefore, a more lengthly description is regarded as unnecessary.

Minor changes in the shape, size and arrangement of details coming within the field of invention claimed may be resorted to in actual practice, if desired.

Having described the invention, what is claimed as new is:

1. In combination, a conventional-type plow embodying a frame having a plow-share and a horizontal beam, a tractor including a wheel-supported chassis, a draft frame embodying a pair of oppositely disposed substantially horizontal forwardly converging arms, said arms being hingedly attached at their forward ends to the trailing end portion of the chassis of the tractor at points on a plane above the center of gravity of the latter, a cross-piece at right angles to and hingedly mounted between the trailing ends of said arms, said plow beam being rigidly connected to the median portion of said cross-piece in order to hingedly attach the plow to the trailing end portion of said frame, a pair of complemental bellcranks hingedly mounted on the rear end portion of the chassis, links hingedly mounted on said bellcrank arms and hingedly connected to the intermediate portions of said frame arms, and force transmitting means connected with the bellcranks and with said plow beam including a hand regulated turnbuckle.

2. In combination, a conventional-type plow embodying a frame having a plow-share and a horizontal beam, a tractor including a wheel-supported chassis, a draft frame embodying a pair of substantially horizontal forwardly converging arms, said arms being hingedly attached at their forward ends to the trailing end portion of the chassis of the tractor, a cross-piece hingedly mounted between the trailing ends of said arms, said plow beam being connected to said cross-piece in order to hingedly attach the plow to the trailing end portion of said frame, a pair of bellcranks hingedly mounted on the rear end portion of the chassis, links hingedly mounted on said bellcrank arms and hingedly connected to the intermediate portions of said first arms, force transmitting means connected with the bellcranks and with said plow beam including a hand regulated turnbuckle, and further including a vertical post rigidly mounted on said plow beam, a portion of the turnbuckle being connected to the upper end of said post and a portion of the turnbuckle being connected to the upstanding arms of the bellcranks.

ROBERT J. BURKHOLDER.

REFERENCES CITED

The following references are of record in the file of this patent:

UNITED STATES PATENTS

| Number | Name | Date |
|---|---|---|
| 2,195,516 | Ferguson | Apr. 2, 1940 |
| 2,309,750 | Carrington | Feb. 2, 1943 |
| 2,347,898 | Ferguson | May 2, 1944 |
| 2,440,550 | Martin | Apr. 27, 1948 |
| 2,455,727 | Bunting | Dec. 7, 1948 |
| 2,460,847 | Schwarz | Feb. 8, 1949 |